United States Patent
Choi et al.

(10) Patent No.: US 12,446,063 B2
(45) Date of Patent: Oct. 14, 2025

(54) ELECTRONIC DEVICE AND METHOD FOR CONTROLLING COMMUNICATION MODE THEREOF

(71) Applicant: Samsung Electronics Co., Ltd., Suwon-si (KR)

(72) Inventors: Sunggi Choi, Suwon-si (KR); Minsoo Kim, Suwon-si (KR); Jeongyong Myoung, Suwon-si (KR); Hyeonu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 253 days.

(21) Appl. No.: 18/155,511

(22) Filed: Jan. 17, 2023

(65) Prior Publication Data
US 2023/0156774 A1 May 18, 2023

Related U.S. Application Data

(63) Continuation of application No. PCT/KR2021/005907, filed on May 11, 2021.

(30) Foreign Application Priority Data

Aug. 4, 2020 (KR) .......................... 10-2020-0097628

(51) Int. Cl.
H04W 72/56 (2023.01)
H04W 28/02 (2009.01)

(52) U.S. Cl.
CPC ....... *H04W 72/56* (2023.01); *H04W 28/0268* (2013.01)

(58) Field of Classification Search
CPC .......................... H04W 72/56; H04W 28/0268
See application file for complete search history.

(56) References Cited

U.S. PATENT DOCUMENTS 8,458,357 B2 6/2013 Menchaca et al.
9,992,127 B2 6/2018 Shukla et al.
(Continued)

FOREIGN PATENT DOCUMENTS

JP 2015-529409 A 10/2015
JP 6145185 B1 6/2017
(Continued)

OTHER PUBLICATIONS

European Search Report dated Nov. 2, 2023, issued in European Application No. 21853762.9.
(Continued)

*Primary Examiner* — Ajay Cattungal
(74) *Attorney, Agent, or Firm* — Jefferson IP Law, LLP

(57) ABSTRACT

An electronic device is provided. The electronic device includes a communication module, and a processor connected thereto. The processor is configured to identify at least one of a plurality of parameters of traffic of data transmitted and received in a specific executing application, by using first short-range wireless communication, detect a data traffic pattern based on the identified parameter, and execute, based on the detected pattern, a communication mode including at least one configuration value related to the first short-range wireless communication. Executing the communication mode includes at least one of being capable of operating in a same frequency band as the first short-range wireless communication, and adjusting a scanning cycle between the first short-range wireless communication and second short-range wireless communication including another short-range wireless communication, setting a priority order of a transport packet, adjusting a channel scanning ratio of the first short-range wireless communication, or establishing boosting for operations of the traffic of the data.

19 Claims, 14 Drawing Sheets

(56) References Cited

U.S. PATENT DOCUMENTS

| | | | |
|---|---|---|---|
| 10,542,449 B2 | 1/2020 | Jung et al. | |
| 12,127,103 B2 * | 10/2024 | Azizi | H04W 4/029 |
| 2008/0254745 A1 | 10/2008 | Zhang et al. | |
| 2009/0176454 A1 | 7/2009 | Chen et al. | |
| 2010/0135256 A1 | 6/2010 | Lee et al. | |
| 2010/0291921 A1 * | 11/2010 | Ruuska | H04W 24/00 |
| | | | 455/426.1 |
| 2010/0316027 A1 | 12/2010 | Rick et al. | |
| 2010/0332667 A1 | 12/2010 | Menchaca et al. | |
| 2011/0002291 A1 | 1/2011 | Gonikberg et al. | |
| 2011/0103799 A1 * | 5/2011 | Shacham | H04B 10/25 |
| | | | 398/115 |
| 2012/0250532 A1 | 10/2012 | Husted et al. | |
| 2013/0121329 A1 | 5/2013 | Desai et al. | |
| 2014/0211676 A1 * | 7/2014 | Chhabra | H04W 76/38 |
| | | | 370/311 |
| 2016/0380885 A1 * | 12/2016 | Jani | H04L 47/781 |
| | | | 370/408 |
| 2017/0086204 A1 | 3/2017 | Jung et al. | |
| 2018/0337850 A1 * | 11/2018 | Jani | H04L 47/125 |
| 2020/0100054 A1 * | 3/2020 | Anders | H04W 28/0226 |
| 2020/0205062 A1 * | 6/2020 | Azizi | H04W 4/46 |
| 2021/0235372 A1 * | 7/2021 | Wang | H04W 24/02 |

FOREIGN PATENT DOCUMENTS

| | | |
|---|---|---|
| KR | 10-2004-0064823 A | 7/2004 |
| KR | 10-2010-0028453 A | 3/2010 |
| KR | 10-2010-0103667 A | 9/2010 |
| KR | 10-2014-0005307 A | 1/2014 |
| KR | 10-2016-0150333 A | 12/2016 |
| KR | 10-1771569 B1 | 8/2017 |
| KR | 10-2017-0121645 A | 11/2017 |
| KR | 10-1795248 B1 | 11/2017 |

OTHER PUBLICATIONS

Korean Office Action dated Jul. 30, 2025, issued in Korean Patent Application No. 10-2020-0097628.

* cited by examiner

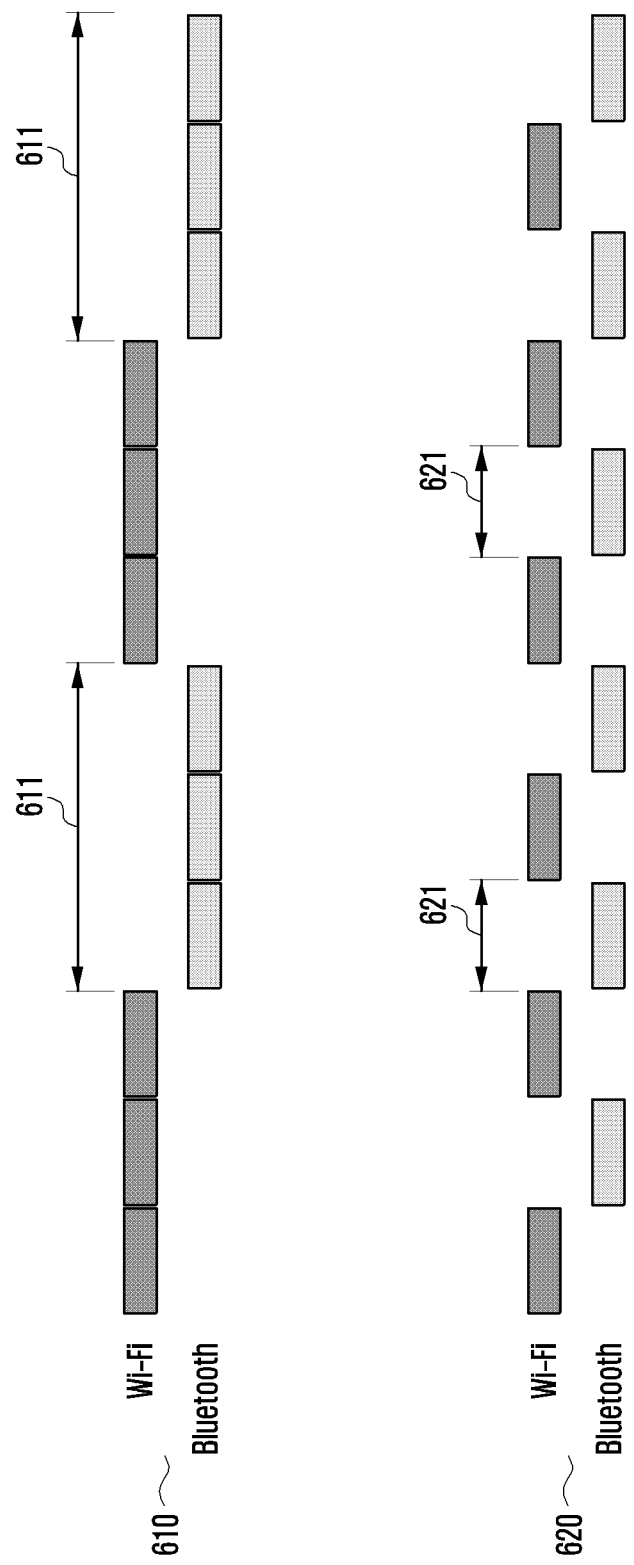

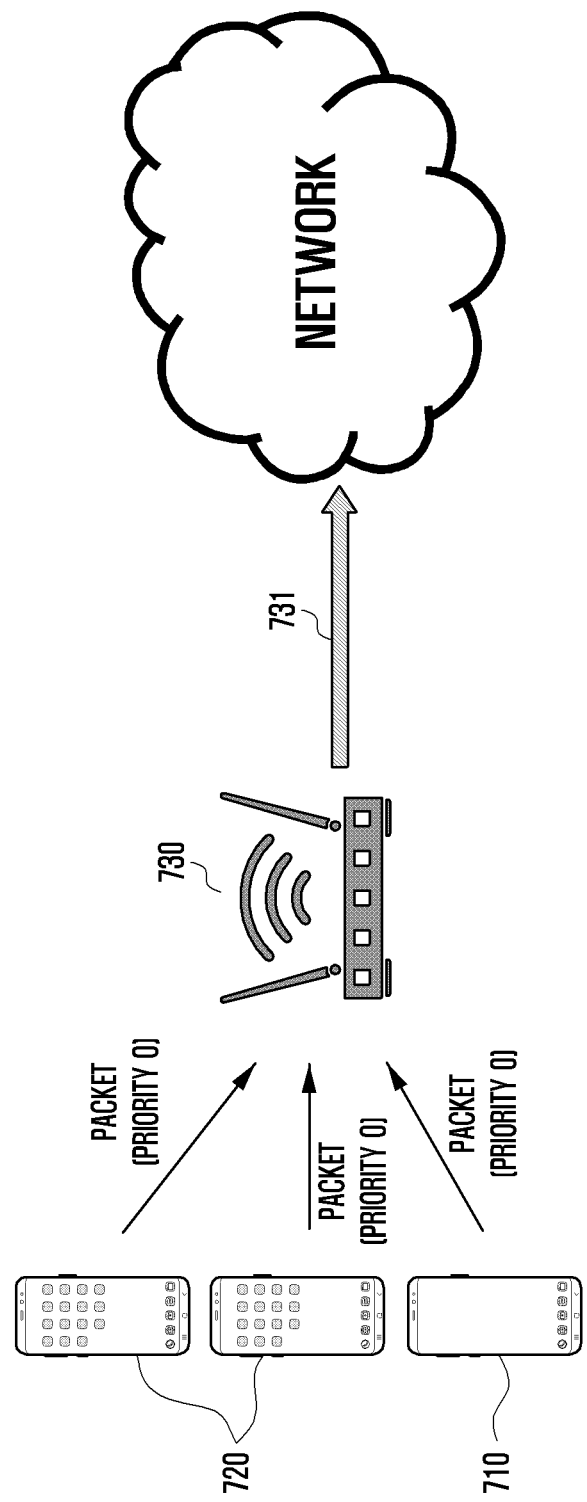

ELECTRONIC DEVICE AND METHOD FOR CONTROLLING COMMUNICATION MODE THEREOF

CROSS-REFERENCE TO RELATED APPLICATION(S)

This application is a continuation application, claiming priority under § 365(c), of an International application No. PCT/KR2021/005907, filed on May 11, 2021, which is based on and claims the benefit of a Korean patent application number 10-2020-0097628, filed on Aug. 4, 2020, in the Korean Intellectual Property Office, the disclosure of which is incorporated by reference herein in its entirety.

BACKGROUND

1. Field

The disclosure relates to an electronic device. More particularly, the disclosure relates to an electronic device which performs wireless communication and dynamically controls a wireless communication mode.

2. Description of Related Art

Recent electronic devices provide various services and additional functions. Such an electronic device may be connected to a network by a wired/wireless communication means, and may transmit or receive data. Data transmission or reception may be performed by various communication methods.

The above information is presented as background information only to assist with an understanding of the disclosure. No determination has been made, and no assertion is made, as to whether any of the above might be applicable as prior art with regard to the disclosure.

SUMMARY

Network requirements may be different according to a service being executed or required to be executed. For example, in a case of a service for which real time performance matters, transmission/reception speed may be a more important requirement compared to data stability. In contrast, in the case of a particular service, stable exchange of a predetermined amount of data may be more important than real time performance. In addition, a network state may change while a service is executed. In order to satisfy requirements suitable for the service, a communication mode of an electronic device may be required to be changed.

Aspects of the disclosure are to address at least the above-mentioned problems and/or disadvantages and to provide at least the advantages described below. Accordingly, an aspect of the disclosure is to provide an electronic device which performs wireless communication and dynamically controls a wireless communication mode.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, and a processor operatively connected to the communication module, wherein the processor is configured to identify at least one of multiple parameters of data traffic transmitted and received using a first short-range wireless communication in a particular application being executed, detect a data traffic pattern, based on the identified at least one parameter, and execute a communication mode including at least one configuration value related to the first short-range wireless communication, based on the detected pattern, and wherein the executing of the communication mode includes at least one of the operations of adjusting a scanning period between the first short-range wireless communication and a second short-range wireless communication which is operable in a frequency band identical to that of the first short-range wireless communication and includes at least one short-range wireless communication different from the first short-range wireless communication, configuring a priority of a transmission packet, adjusting a channel scan ratio of the first short-range wireless communication, and configuring boosting for calculation of the data traffic transmitted and received by the processor.

According to various embodiments, a communication-related configuration of an electronic device may be dynamically changed to correspond to a service being used by the electronic device and a resultant data traffic state, so as to satisfy a needed network communication requirement.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A and 6B schematize adjustment of a wireless communication network scanning period of an electronic device according to various embodiments of the disclosure;

FIGS. 7A and 7B schematize a packet transmission control of an electronic device according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
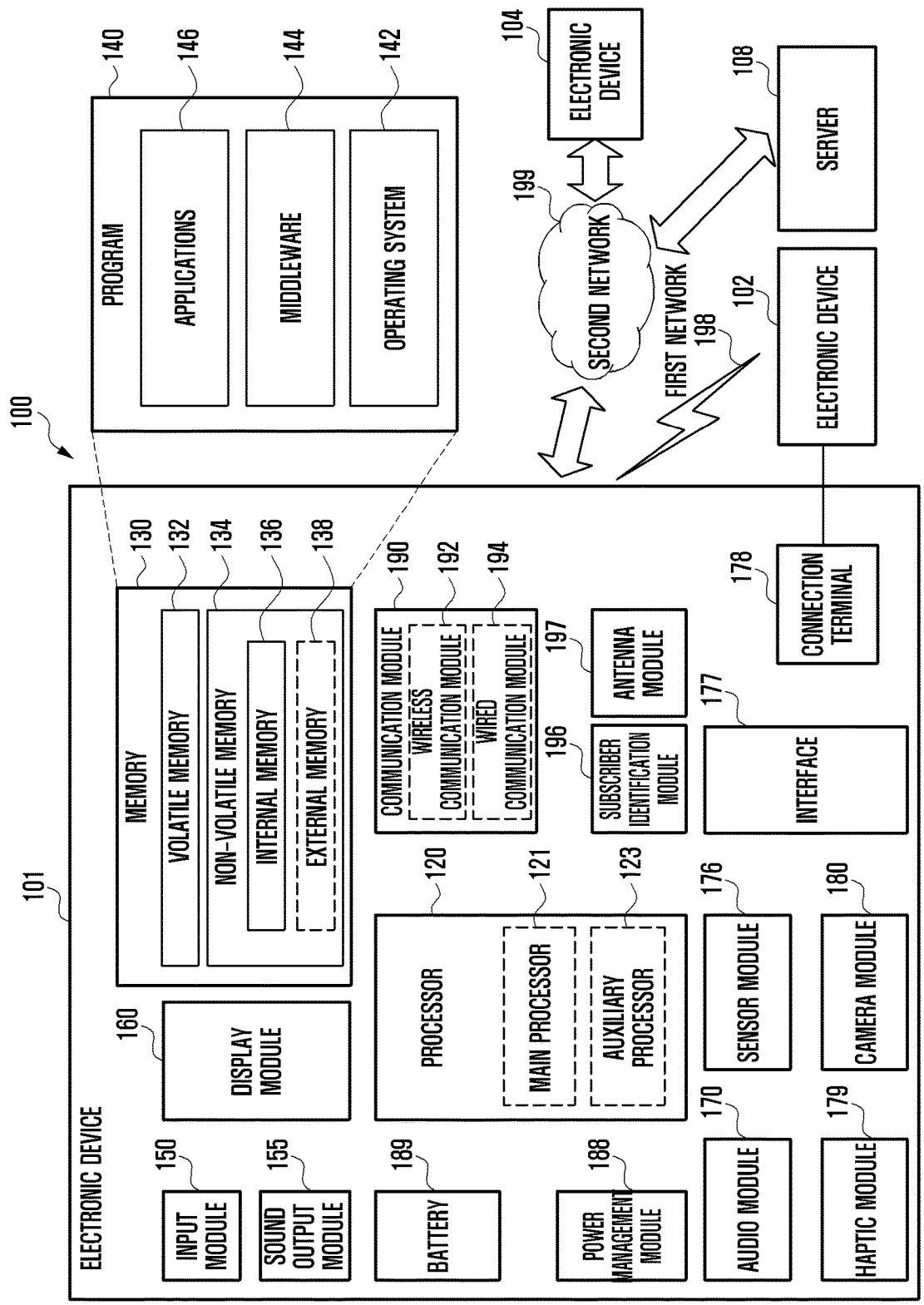
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
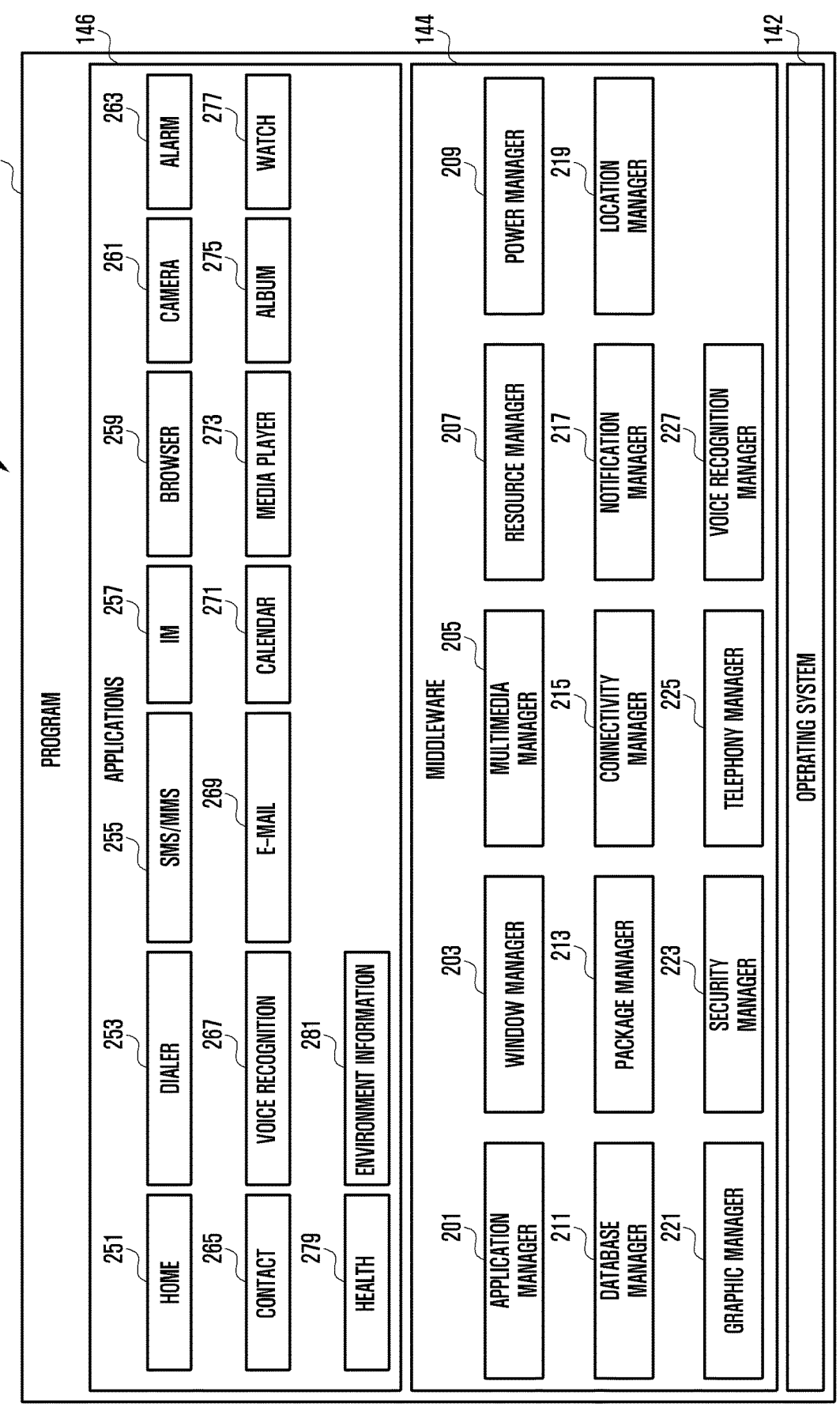
FIG. 2 is a block diagram of a program according to an embodiment of the disclosure.

FIG. 2 is a block diagram 200 illustrating the program 140 according to an embodiment of the disclosure.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environment information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
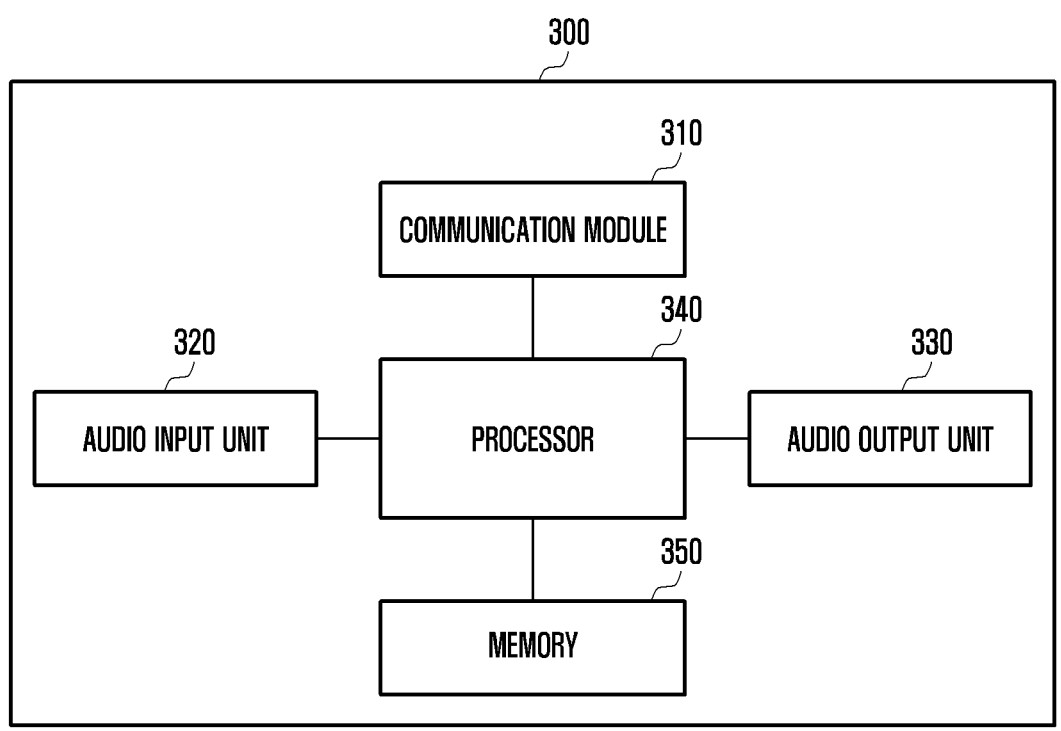
FIG. 3 is a block diagram of an electronic device 300 according to an embodiment of the disclosure.

FIG. 3 is a block diagram of an electronic device 300 according to an embodiment of the disclosure.

The electronic device 300 (e.g., the electronic device 101 in FIG. 1) may communicate with a network via short range wireless communication (e.g., Bluetooth, Bluetooth low energy, or Wi-Fi). The electronic device 300 may communicate with a network via long range wireless communication (e.g., 5G network or ultra-wideband (UWB)).

The electronic device 300 may include a communication module 310, an audio input unit 320, an audio output unit 330, a processor 340, and a memory 350. According to various embodiments, the electronic device 300 may include at least some of the elements and/or functions of the electronic device 101 in FIG. 1.

The communication module 310 may include a software and/or hardware module (e.g., a communication processor (CP)) for wireless communication with a network or an external device (e.g., the electronic device 102, the electronic device 104, or the server 108 in FIG. 1), and may include at least some of the elements and/or functions of the wireless communication module 192 in FIG. 1. According to various embodiments, the communication module 310 may communicate with an external device via a short range communication network (e.g., Bluetooth). According to various embodiments, the communication module 310 may communicate with an external device via a long range communication network (e.g., ultra-wideband (UWB)). According to various embodiments, the communication module 310 may transmit data provided from the processor 340, to an external device, or may receive data from an external device and transfer same to the processor 340. According to an embodiment, the communication module 310 may include a wireless communication module (e.g., a cellular communication module, a short-range wireless communication module, or a global navigation satellite system (GNSS) communication module), or the wired communication module 194 (e.g., a local area network (LAN) communication module or a power-line communication module). A corresponding communication module among the communication modules described above may communicate with an external electronic device via a first network (e.g., the first network 198 in FIG. 1) (e.g., a short-range communication network such as Bluetooth, Wi-Fi direct, or infrared data association (IrDA)), or a second network (e.g., the second network 199 in FIG. 2) (e.g., a long-range communication network such as a legacy cellular network, a 5G network, a next-generation communication network, the Internet, or a computer network (e.g., a LAN or WAN)). Various types of communication modules as described above may be integrated into one element (e.g., a single chip), or may be implemented as multiple separate elements (e.g., multiple chips).

The audio input unit 320 may receive an audio signal. According to various embodiments, the audio input unit 320 may receive an audio signal from a user or the outside, generate information or an electrical signal according to the audio signal, and provide same to the processor 340. According to various embodiments, the audio input unit 320 may include a microphone, and the microphone may include at least some of the elements and/or functions of the input module 150 and the audio module 170 in FIG. 1.

The audio output unit 330 may output an audio signal. According to various embodiments, the audio output unit 330 may receive an electrical signal from the processor 340, and output same by using an audio signal. According to various embodiments, the audio output unit 330 may include a speaker, and the speaker may include at least some of the elements and/or functions of the sound output module 155 and the audio module 170 in FIG. 1.

The processor 340 may process data in the electronic device 300, control at least one different element of the electronic device 300, and perform data processing or calculation. The processor 340 may include at least some of the functions and/or elements of the processor 120 in FIG. 1. The processor 340 may be electrically and/or functionally connected to an element of the electronic device 300, such as the communication module 310, the audio input unit 320, and/or the audio output unit 330. According to various embodiments, there is no limit to calculation and data processing functions implementable by the processor 340 in the electronic device 300. However, in various embodiments of the disclosure, specific operations for change of communication mode of the electronic device 300 will be discussed mainly.

The processor 340 may detect whether an application or a service of the electronic device 300 is executed. According to various embodiments, the processor 340 may execute an application, and detect an execution state of the application. The processor 340 may identify whether the detected application uses a network. According to various embodiments, the processor 340 may identify information including a category of the detected application, and an execution authority, and identify whether the application is an application accompanying network use.

The processor 340 may monitor data traffic transmitted and received with a network of the electronic device 300. According to various embodiments, the processor 340 may identify and analyze information relating to data traffic transmitted and received with the communication module 310 during communication with a network. According to various embodiments, the information relating to data traffic may correspond to a predetermined parameter related to the data traffic or a set of parameters related thereto. According to various embodiments, the processor 340 may monitor data traffic related to a currently executed application, and may also monitor the entire data traffic of the electronic device 300 independently of the application being executed. According to various embodiments, the processor 340 may identify a type of a currently executed package, and a state of a connected network, and may identify multiple parameter values including a state of coexistence between different networks (e.g., Bluetooth, Bluetooth low energy, Wi-Fi, and UWB), the number of transmitted or received packets per hour, a size of a packet, a protocol of a packet (e.g., transmission control protocol (TCP) or user datagram protocol (UDP)), a reception interval of a packet, a bandwidth of a packet, a round trip time (RTT), retransmission, and noise. According to various embodiments, the processor 340 may combine detected parameter values or reprocess a parameter value to generate and identify a new parameter value. For example, the processor 340 may apply a weight to some parameter values. The processor 340 may monitor data traffic and store identified parameter values related to the data traffic in the memory 350 of the electronic device 300.

The processor 340 may detect a data traffic pattern, based on identified multiple parameter values. According to various embodiments, the processor 340 may detect a traffic pattern, based on at least one of identified multiple parameters. According to various embodiments, the traffic pattern may be based on a set of multiple parameter values. For example, the processor 340 may use at least one value among multiple parameter values to identify whether the value corresponds to a particular traffic pattern. According to various embodiments, the processor 340 may detect a traffic pattern, based on a threshold of a parameter, which is pre-stored in the memory 350 of the electronic device 300. According to various embodiments, the processor 340 may store condition parameter values for a predetermined pattern in the memory 350, and if identified parameter values related to data traffic described above satisfy condition parameters, may detect a determined traffic pattern. There may be multiple traffic patterns. According to various embodiments, the processor 340 may identify data traffic parameter values, and estimate a network requirement required for the electronic device 300 by using the values. According to various embodiments, the processor 340 may recognize, based on at least one parameter value, that a current traffic pattern is a pattern requiring low latency. For example, in a case of using a UDP packet, if a period of the packet is relatively short, a pattern may be recognized as a pattern requiring low latency. According to various embodiments, the processor 340 may recognize that a pattern is a pattern requiring high throughput. According to various embodiments, the processor 340 may recognize that a pattern is a general pattern not requiring change of a network communication mode of the electronic device 300.

The processor 340 may monitor an audio path of the electronic device 300. According to various embodiments, the processor 340 may control input and output of an audio signal of the electronic device 300, and identify a signal path from input of an audio signal to output thereof in the electronic device 300. According to various embodiments, the processor 340 may identify a path in which the audio input unit 320 of the electronic device 300 receives an input of an audio signal and transfers an electrical signal generated as the audio signal to the processor. According to various embodiments, the processor 340 may identify a path for transferring, to the audio output unit 330, an electrical signal for an audio signal to be output by the processor. According to various embodiments, the processor 340 may simultaneously identify a path of a signal transferred from the audio input unit 320 to the processor 340, and a path of a signal transferred from the processor 340 to the audio output unit 330. According to various embodiments, when a temporal interval between a signal received from the audio input unit 320 and a signal transferred by the processor 340 to the audio output unit 330 is smaller than a predetermined time, the processor 340 may identify that an audio path has been generated. According to various embodiments, the processor 340 may identify a change of transmission paths of all signals related to an audio signal, and detect an audio path, based on the change. According to various embodiments, the processor 340 may generate a signal path of the audio input unit 320 and the audio output unit 330 by using audio control module software included in a program (e.g., the program 140). For example, the processor 340 may generate a path of the audio input unit 320 and the audio output unit 330 according to a request generated from a program (e.g., the program 140) such as a call manager (e.g., the call manager 225 in FIG. 2) or a voice over internet protocol (VoIP)-related application. According to various embodiments, the processor 340 may identify a VoIP audio path generated using audio control module software.

The processor 340 may determine a communication mode, based on a data traffic pattern. According to various embodiments, the processor 340 may detect a data traffic pattern and determine a communication mode corresponding to a network requirement estimated based on the detected pattern. According to various embodiments, the processor 340 may pre-learn which communication mode the processor is to determine by using at least one of identified parameters. For example, in a case of performing monitoring for a traffic pattern, the processor may pre-learn a traffic pattern model by using a machine learning model such as a convolutional neural network (CNN), and determine a communication mode as a result of providing, as input, stored parameter values related to data traffic for a predetermined time by using the learned model. According to various embodiments, the communication mode may be multiple modes corresponding to multiple traffic patterns. For example, the multiple modes may include a low latency mode corresponding to a low latency pattern, a high throughput mode corresponding to a high throughput pattern, and a general mode corresponding to a general pattern.

The processor 340 may determine a communication mode, based on a detected audio path. According to various embodiments, when an audio path is detected, the processor 340 may recognize that a voice over Internet protocol (VoIP) function is being executed. According to various embodiments, when an audio path is detected, the processor 340 may recognize a situation requiring low latency for network communication. According to various embodiments, when an audio path is detected, the processor 340 may determine a low latency mode as a communication mode.

The processor 340 may execute a determined communication mode. According to various embodiments, the processor 340 may change at least one configured value related to network communication according to a determined communication mode, and/or at least one configured value related to data processing.

According to various embodiments, the processor 340 may adjust communication with multiple types of networks using the same frequency band. For example, the processor may adjust communication with a Wi-Fi network and Bluetooth (Bluetooth or Bluetooth low energy) using the same band. As another example, when a Wi-Fi network and a UWB network use the same frequency band, the processor may adjust communication with each network. According to various embodiments, when communication with multiple networks is adjusted, the processor may change a period of scanning each network for a signal. An operation of adjusting communication with multiple networks will be described later. According to various embodiments, the processor 340 may adjust the priority of a transmitted packet. According to various embodiments, the processor 340 may assign a high priority to a data packet related to a currently executed application performing wireless network communication. According to various embodiments, the processor 340 may assign or change a priority meeting a network requirement with respect to a transmitted data packet. An operation of adjusting the priority of a packet will be described later. According to various embodiments, the processor 340 may adjust a scan ratio for multiple channels existing on the same network. According to various embodiments, when the processor 340 accesses a particular channel of a Wi-Fi network to perform communication, the processor may adjust a ratio of scanning a currently accessed channel and a ratio of scanning a different channel. An operation of adjusting channel scanning will be described later. According to various embodiments, the processor 340 may adjust a boosting configuration of the processor 340. According to various embodiments, the processor 340 may change a ratio of allocating data processing resources in a system, to adjust a data processing speed of the system. According to various embodiments, when a high throughput mode is determined, the processor 340 may configure boosting by controlling a configuration of a system to increase throughput. According to various embodiments, the processor 340 may configure boosting which controls a calculation speed per hour. According to various embodiments, the processor 340 may configure a calculation speed by controlling a clock frequency per hour, and configure boosting by increasing a clock frequency.

The processor 340 may monitor a network communication environment. According to various embodiments, the processor 340 may receive feedback for an actual network environment of an accessible network and a currently accessed network. According to various embodiments, the processor 340 may identify feedback for a network environment by using information on an electric field strength of a network, and information on time consumed for data transmission or reception. For example, the processor 340 may identify a received signal strength indication (RSSI), a signal-to-noise ratio (SNR), Tx failure, a Tx-retransmission ratio, and clear channel assessment (CCA). According to various embodiments, the processor 340 may change to a needed communication mode when it is determined, based on a monitored network communication environment and a received feedback, that a change of a communication mode is needed.

The processor 340 may continuously monitor data traffic and an audio path even after changing a communication mode. According to various embodiments, when a data traffic pattern detected through continuous monitoring is different from an existing pattern, the processor may return a changed communication mode to an existing communication mode or change same to a different mode. According to various embodiments, when an audio path is not detected any longer, the processor 340 may identify that the audio path is not detected, and re-change a communication mode from a low latency mode executed according to detection of an audio path, to a general mode again. According to various embodiments, the processor 340 may execute a re-changed communication mode.

The memory 350 may store various data used by the electronic device 300. According to various embodiments, the memory 350 is configured to temporarily or permanently store non-limited pieces of data, and may include at least one of the elements and/or functions of the memory 130 in FIG. 1. The data may include, for example, software (e.g., the program 140), and input data or output data related to a command related thereto. According to an embodiment, the memory 350 may, when executed, store instructions causing the processor 340 to operate. For example, according to an embodiment, the memory 350 may store various instructions executable via the processor 340 when control of a communication mode is executed. According to various embodiments, the memory 350 may store a threshold of a parameter for detection of a traffic pattern. For example, the memory 350 may store condition parameter values related to a predetermined pattern.

Figure 4:
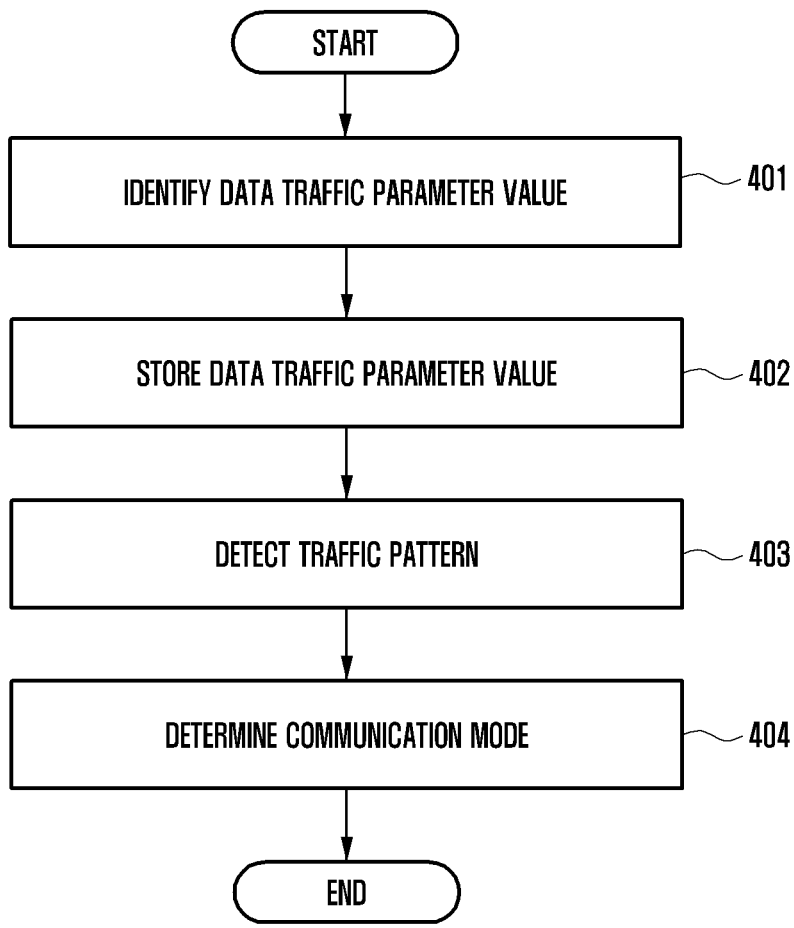
FIG. 4 is a flowchart of changing a communication mode of an electronic device according to an embodiment of the disclosure.

FIG. 4 is a flowchart of changing a communication mode of an electronic device according to an embodiment of the disclosure.

In operation 401, the processor 340 may detect (or identify) a parameter value related to data traffic. According to various embodiments, the processor 340 may monitor data traffic transmitted and received with a network of the electronic device 300. According to various embodiments, the processor 340 may identify and analyze information relating to data traffic transmitted and received with the communication module 310 during communication with a network. According to various embodiments, the information relating to data traffic may correspond to a predetermined parameter related to the data traffic or a set of parameters related thereto. According to various embodiments, the processor 340 may identify a type of a currently executed package, and a state of a connected network, and may identify multiple parameter values including a state of coexistence between different networks (e.g., Bluetooth, Bluetooth low energy, Wi-Fi, and/or UWB), the number of transmitted or received packets per hour, a size of a packet, a type of a protocol of a packet (e.g., transmission control protocol (TCP) or user datagram protocol (UDP)), a reception interval of a packet, a bandwidth of a packet, a round trip time (RTT), retransmission, and/or noise. According to various embodiments, the processor 340 may combine detected parameter values or reprocess a parameter value to generate and identify a new parameter value. For example, the processor 340 may apply a weight to some parameter values.

In operation 402, the processor 340 may store the detected data traffic parameter value. According to various embodiments, the processor 340 may store a parameter value related to data traffic in the memory 350. The processor 340 may monitor data traffic and store identified parameter values related to the data traffic in the memory 350 of the electronic device 300.

In operation 403, the processor 340 may analyze (or detect) a traffic pattern, based on the detected and stored data traffic parameter values. According to various embodiments, the processor 340 may detect a traffic pattern, based on at least one of detected multiple parameters. According to various embodiments, the traffic pattern may correspond to a set of identified at least one parameter values. The processor 340 may use at least one value among multiple parameter values to identify whether the value corresponds to a particular traffic pattern. According to various embodiments, the processor 340 may detect a traffic pattern, based on a threshold of a parameter, which is pre-stored in the memory 350 of the electronic device 300. According to various embodiments, the processor 340 may store condition parameter values for a predetermined pattern in the memory 350, and if identified parameter values related to data traffic described above satisfy condition parameters, may detect a determined traffic pattern. There may be multiple traffic patterns. According to various embodiments, the processor 340 may identify data traffic parameter values, and estimate a network requirement required for the electronic device 300 by using the values. According to various embodiments, the processor 340 may recognize, based on at least one parameter value, that a current traffic pattern is a pattern requiring low latency. For example, in a case of using a UDP packet, if a period of the packet is relatively short, a pattern may be recognized as a pattern requiring low latency. According to various embodiments, the processor 340 may recognize that a pattern is a pattern requiring high throughput. According to various embodiments, the processor 340 may recognize that a pattern is a general pattern not requiring change of a network communication mode of the electronic device 300. According to various embodiments, the processor 340 may pre-learn which communication mode the processor is to determine by using at least one of identified parameters, and may use same in analysis. For example, in a case of performing monitoring for a traffic pattern, the processor may pre-learn a traffic pattern model by using a machine learning model such as a convolutional neural network (CNN), and analyze a traffic pattern as a result of providing, as input, stored parameter values related to data traffic for a predetermined time by using the learned model.

In operation 404, the processor 340 may determine a communication mode, based on the traffic pattern analyzed in operation 403. The communication mode determined by the processor 340 in operation 404 may be a communication mode for a Wi-Fi network. For example, in operation 404, the processor 340 may determine a Wi-Fi mode of the electronic device 300. According to various embodiments, the processor may determine a network requirement, based on the analyzed traffic pattern, and the communication mode may include the network requirement. According to various embodiments, the network requirement may include a low latency state and a high throughput state. According to various embodiments, the processor 340 may determine a mode including the determined network requirement, as a communication mode. According to various embodiments, the processor 340 may execute the determined communication mode. For example, when the network requirement corresponds to a low latency state, the processor 340 may adjust communication with multiple types of networks using the same frequency band, adjust the priority of a packet, and/or a channel scan ratio. As another example, when the network requirement corresponds to a high throughput state, the processor 340 may change a ratio of allocating data processing resources in a system, to adjust a data processing speed of the system (e.g., perform system boosting).

Figure 5A:
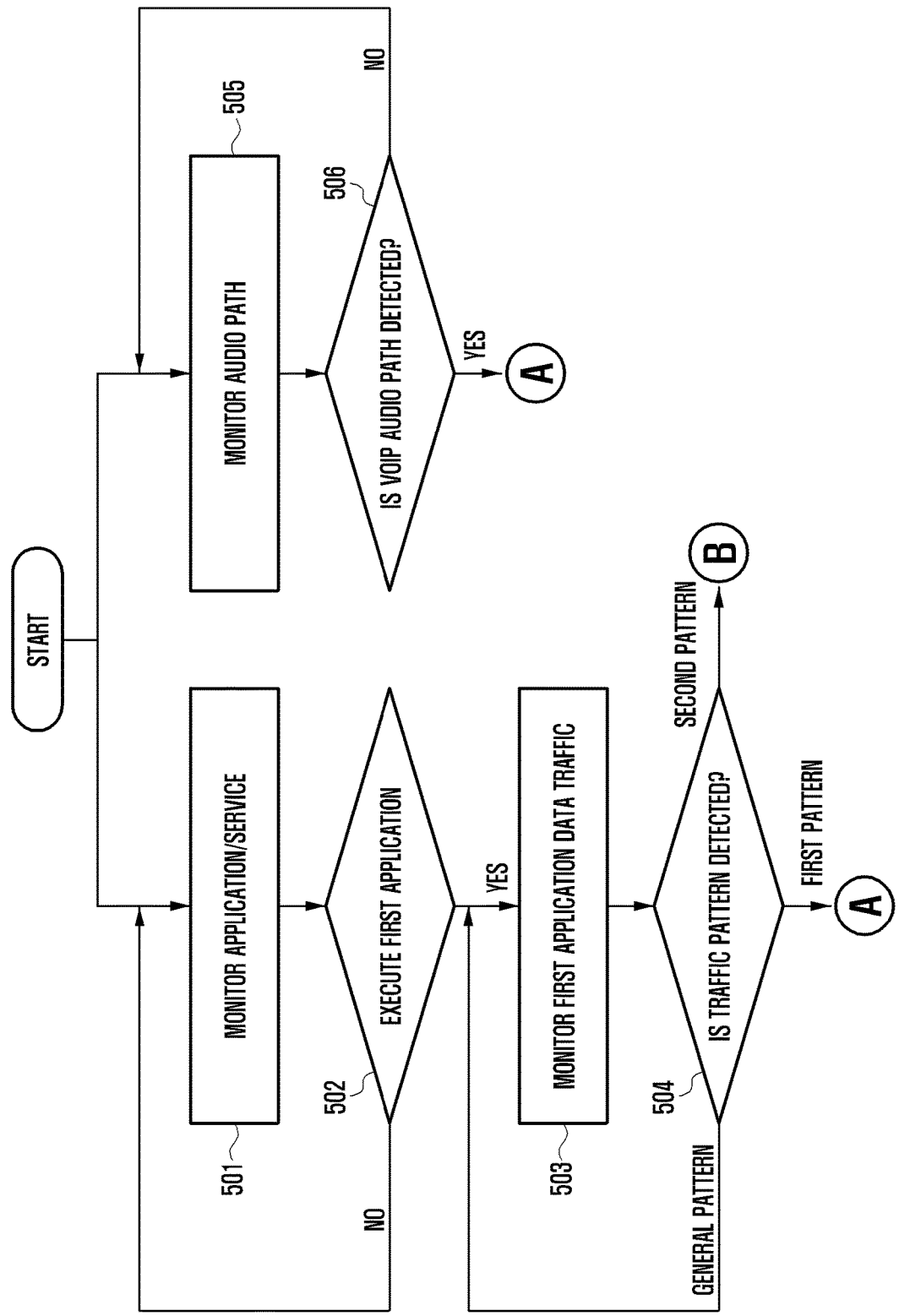
FIGS. 5A, 5B, and 5C are flowcharts of changing a communication mode of an electronic device according to various embodiments of the disclosure.
Figure 5B:
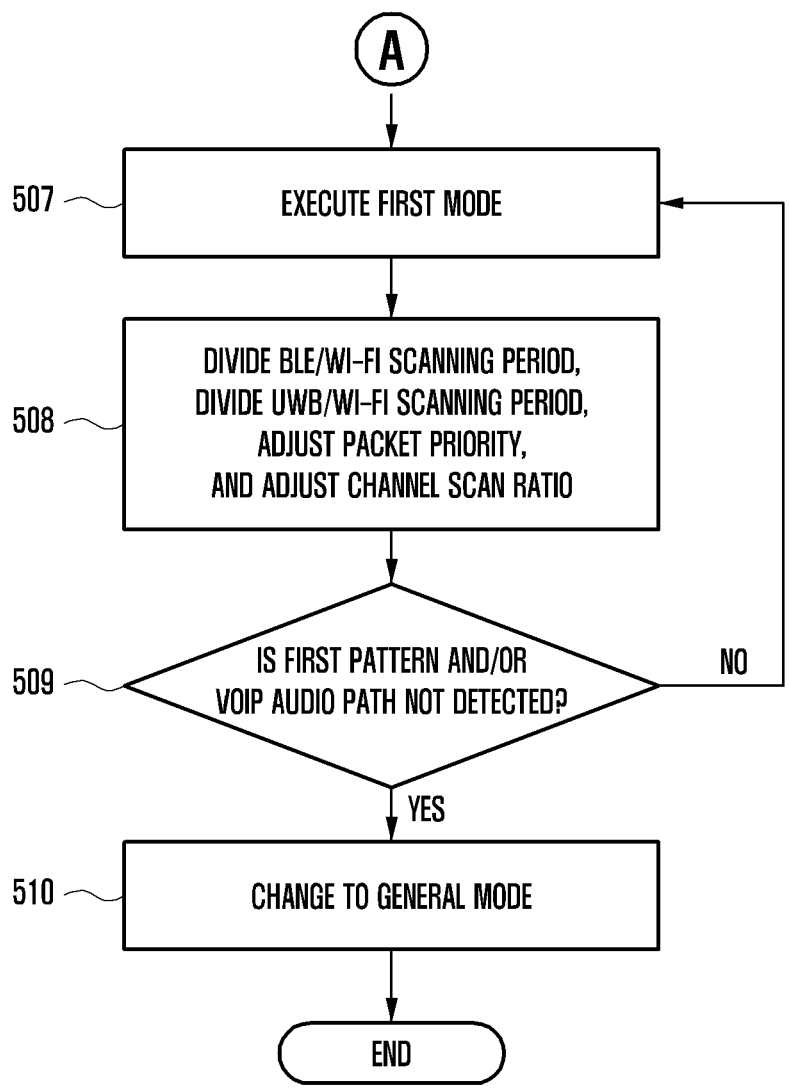
Figure 5C:
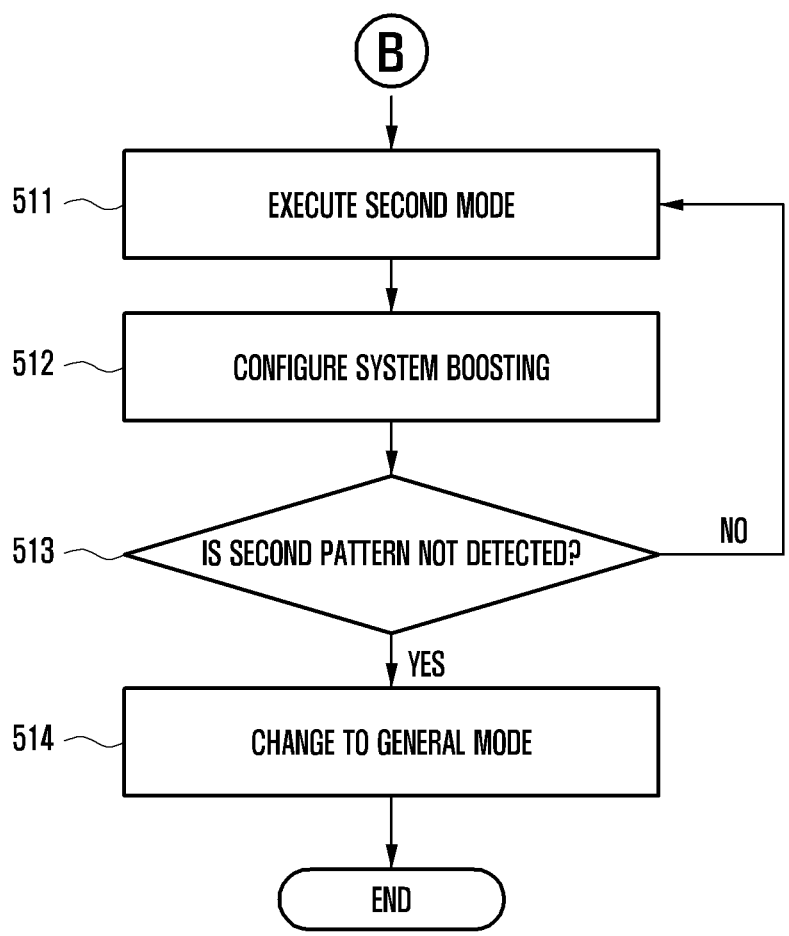

FIGS. 5A, 5B, and 5C are flowcharts of changing a communication mode of the electronic device 300 according to various embodiments of the disclosure.

FIG. 5A is a flowchart of detecting a data traffic pattern according to an embodiment of the disclosure.

In operation 501, the processor 340 may monitor an application or a service of the electronic device 300. According to various embodiments, the processor 340 may detect whether an application or a service of the electronic device 300 is executed. According to various embodiments, the processor 340 may execute an application, and detect an execution state of the application. The processor 340 may identify whether the detected application uses a network. According to various embodiments, the processor 340 may identify information including a category of the detected application, and an execution authority, and identify whether the application is an application accompanying network use. According to various embodiments, the processor 340 may continuously monitor whether an application is executed, and information related to an application being executed. For example, the processor 340 may identify whether an application being executed uses a network, periodically or at a designated time.

In operation 502, the processor 340 may identify whether a first application is executed during monitoring. According to various embodiments, the first application may be an application using a network. According to various embodiments, the first application may be an application using a Wi-Fi network. When execution of the first application is identified, the processor 340 may proceed to operation 503, and when execution of the first application is not identified, the processor may continuously monitor whether an application is executed. According to various embodiments, information relating to the first application may be stored in the memory 350. For example, when an application is stored or installed in the memory 350 of the electronic device 300, information relating to whether the first application is an application using a network may be stored in the memory 350. When an application is executed, the processor 340 may identify whether the executed application is included in the first application.

In operation 503, the processor 340 may monitor data traffic of the executed application. According to various embodiments, the processor 340 may monitor data traffic related to the first application. According to various embodiments, the processor 340 may identify and analyze information relating to data traffic related to the first application, which is transmitted and received with the communication module 310 during communication with a network. According to various embodiments, the information relating to data traffic may correspond to a predetermined parameter related to the data traffic or a set of parameters related thereto. According to various embodiments, the processor 340 may monitor data traffic related to the first application, but may also monitor the entire data traffic of the electronic device 300 independently of the first application. According to various embodiments, the processor may monitor data traffic related to a second application that is a background application, instead of the first application that is a foreground application. According to various embodiments, the processor 340 may identify a type of a currently executed package, and a state of a connected network, and may identify multiple parameter values including a state of coexistence between different networks (e.g., Bluetooth, Bluetooth low energy, Wi-Fi, and/or UWB), the number of transmitted or received packets per hour, a size of a packet, a protocol of a packet (e.g., transmission control protocol (TCP) or user datagram protocol (UDP)), a reception interval of a packet, a bandwidth of a packet, a round trip time (RTT), retransmission, and/or noise. According to various embodiments, the processor 340 may combine detected parameter values or reprocess a parameter value to generate and identify a new parameter value. The processor 340 may monitor data traffic and store identified parameter values related to the data traffic in the memory 350 of the electronic device 300. For example, the processor 340 may monitor data traffic periodically or at a designated time, and store identified parameter values related to the data traffic in the memory 350.

In operation 504, the processor 340 may detect a data traffic pattern. According to various embodiments, the processor 340 may detect a data traffic pattern by using parameter values of data traffic related to the first application being executed, which are obtained as a result of the monitoring in operation 503. According to various embodiments, the traffic pattern may be based on a set of multiple parameter values. For example, the processor 340 may use at least one value among multiple parameter values to identify whether the value corresponds to a particular traffic pattern. According to various embodiments, the processor 340 may detect a traffic pattern, based on a threshold of a parameter, which is pre-stored in the memory 350 of the electronic device 300. According to various embodiments, the processor 340 may store condition parameter values for a predetermined pattern in the memory 350, and if identified parameter values related to data traffic described above satisfy condition parameters, may detect a determined traffic pattern. For example, there may be multiple traffic patterns stored in the memory 350. According to various embodiments, the processor 340 may identify data traffic parameter values, and estimate a network requirement required for the electronic device 300 by using the values. According to various embodiments, the processor 340 may recognize, based on at least one parameter value, that a current traffic pattern is a pattern requiring low latency. For example, in a case of using a UDP packet, if a period of the packet is relatively short, a pattern may be recognized as a pattern requiring low latency. According to various embodiments, the processor 340 may recognize that a pattern is a pattern requiring high throughput. According to various embodiments, the processor 340 may recognize that a pattern is a general pattern not requiring change of a network communication mode of the electronic device 300. The processor 340 may recognize a pattern requiring low latency among detected patterns as a first pattern, and a pattern requiring high throughput as a second pattern, and when a pattern does not correspond to the first pattern and the second pattern, may recognize the pattern as a general pattern. According to various embodiments, when a general pattern is detected, the processor 340 may return to operation 503 and continuously monitor data traffic, when the first pattern is detected, may proceed to operation A, or when the second pattern is detected, may proceed to operation B.

In operation 505, the processor 340 may monitor an audio path of the electronic device 300. According to various embodiments, the processor 340 may control input and output of an audio signal of the electronic device 300, and identify a signal path from input of an audio signal to output thereof in the electronic device 300. According to various embodiments, the processor 340 may identify a path in which the audio input unit 320 of the electronic device 300 receives an input of an audio signal, and transfers an electrical signal generated as the audio signal to the processor. According to various embodiments, the processor 340 may identify a path for transferring, to the audio output unit 330, an electrical signal for an audio signal to be output by the processor.

In operation 506, the processor 340 may detect a VoIP audio path of the electronic device 300. According to various embodiments, the processor 340 may simultaneously identify a path of a signal transferred from the audio input unit 320 to the processor 340, and a path of a signal transferred from the processor 340 to the audio output unit 330. According to various embodiments, when a temporal interval between a signal received from the audio input unit 320 and a signal transferred by the processor 340 to the audio output unit 330 is smaller than a predetermined time, the processor 340 may identify that an audio path has been generated. According to various embodiments, the processor 340 may generate a signal path of the audio input unit 320 and the audio output unit 330 by using audio control module software included in a program (e.g., the program 140). For example, the processor 340 may generate a path of the audio input unit 320 and the audio output unit 330 according to a request generated from a program (e.g., the program 140) such as a call manager (e.g., the call manager 225 in FIG. 2) or a VoIP-related application. According to various embodiments, the processor 340 may monitor a VoIP audio path by using audio control module software, and identify the generated VoIP audio path. According to various embodiments, the processor 340 may identify a change of transmission paths of all signals related to an audio signal, and detect an audio path, based on the change. According to various embodiments, the processor 340 may detect generation of a VoIP audio path, based on information of the first application executed in operation 502, and information relating to the data traffic monitored in operation 503 and the detected audio path. According to another embodiment, the processor 340 may detect an audio path and recognize same as information indicating that a VOIP function is being executed. The processor 340 may proceed to operation A when a VoIP audio path is detected, and may return to operation 505 and continuously monitor an audio path when same is not detected.

According to an embodiment, the processor 340 may sequentially or substantially simultaneously perform operation 501 and operation 505. For example, the processor may perform operation 501 and operation 505 according to a designated period. According to another embodiment, the processor 340 may perform operation 505 when execution of the first application is identified in operation 502. For example, the processor 340 may perform operation 505 when execution of the first application using a network is identified. According to another embodiment, the processor 340 may perform operation 505 when a traffic pattern is detected in operation 504. For example, the processor 340 may perform operation 505 to identify whether the first application uses a VoIP audio path.

FIG. 5B is a flowchart illustrating a communication mode change after operation A of FIG. 5A according to an embodiment of the disclosure.

In operation 507, the processor 340 may execute a first mode. For example, the first mode may be a mode reflecting a network requirement estimated from the first pattern. According to various embodiments, when a VoIP audio path is detected, the processor 340 may determine a state requiring low latency for network communication in order to accomplish smooth call. According to various embodiments, when a VoIP audio path is detected, the processor 340 may execute the first mode. According to various embodiments, the first mode may be a mode corresponding to a low latency pattern.

In operation 508, the processor 340 may execute the first mode, and change at least one configured value related to network communication, and/or at least one configured value related to data processing according to the first mode. In operation 508, the processor 340 may adjust communication with multiple types of networks using the same frequency band. For example, the processor may adjust communication with a Wi-Fi network and Bluetooth (e.g., Bluetooth or Bluetooth low energy (BLE)) using the same band. As another example, when a Wi-Fi network and a UWB network use the same frequency band, the processor may adjust communication with each network. According to various embodiments, when communication with multiple networks is adjusted, the processor may change a period of scanning each network for a signal. An operation of adjusting communication with multiple networks will be described later.

In operation 508, the processor 340 may adjust the priority of a transmitted packet. According to various embodiments, the processor 340 may assign a high priority to a data packet related to a currently executed application performing wireless network communication. According to various embodiments, the processor 340 may assign or change a priority meeting a network requirement with respect to a transmitted data packet. An operation of adjusting the priority of a packet will be described later.

In operation 508, the processor 340 may adjust a scan ratio for multiple channels existing on the same network. According to various embodiments, when the processor 340 accesses a particular channel of a Wi-Fi network to perform communication, the processor may adjust a ratio of scanning a currently accessed channel and a ratio of scanning a different channel. An operation of adjusting channel scanning will be described later.

In operation 509, the processor 340 may detect a change of a data traffic pattern or a change of an audio path. The processor 340 may continuously monitor data traffic and/or an audio path even while executing the first mode. According to various embodiments, when the first pattern is not detected any longer while the first mode is executed, the processor 340 may recognize that a network requirement corresponding to the first pattern is removed, and re-change a communication mode. According to various embodiments, when a VoIP audio path is not detected any longer while the first mode is executed, the processor 340 may recognize that a VoIP function is terminated and a network requirement for low latency is removed, and re-change a communication mode. According to various embodiments, when a general pattern is detected, the processor 340 may change a communication mode to a general mode as in operation 510, or when the second pattern is detected, the processor may change the communication mode to a second mode.

When a communication mode is re-changed to a general mode as in operation 510, the processor 340 may change back, to an existing state (e.g., a general state), at least one configured value related to network communication and/or at least one configured value related to data processing, which were changed in the first mode.

FIG. 5C is a flowchart illustrating a communication mode change after operation B of FIG. 5A according to an embodiment of the disclosure.

In operation 511, the processor 340 may execute a second mode. For example, the second mode may be a mode reflecting a network requirement estimated from the second pattern. According to various embodiments, the second mode may be a mode corresponding to a high throughput pattern.

In operation 512, the processor 340 may execute the second mode, and change at least one configured value related to network communication, and/or at least one configured value related to data processing according to the second mode. According to various embodiments, the processor 340 may adjust a boosting configuration. According to various embodiments, the processor 340 may change a ratio of allocating data processing resources in a system, to adjust a data processing speed of the system. According to various embodiments, when a high throughput mode is determined, the processor 340 may configure, for example, boosting as an operation of increasing a data processing speed by controlling a configuration of a system to increase throughput. For example, the processor 340 may configure boosting which controls a calculation speed per hour. According to various embodiments, the processor 340 may configure a calculation speed by controlling a clock frequency per hour, and configure boosting by increasing a clock frequency.

In operation 513, the processor 340 may detect a change of a data traffic pattern or a change of an audio path. The processor 340 may continuously monitor data traffic and an audio path even while executing the second mode. According to various embodiments, when the second pattern is not detected any longer while the second mode is executed, the processor 340 may recognize that a network requirement corresponding to the second pattern is removed, and re-change a communication mode. According to various embodiments, in operation 513, the processor 340 may detect a change of a data traffic pattern or a change of an audio path. The processor 340 may continuously monitor data traffic and an audio path even while executing the second mode. According to various embodiments, when the second pattern is not detected any longer while the second mode is executed, the processor 340 may recognize that a network requirement corresponding to the second pattern is removed, and re-change a communication mode.

When a communication mode is re-changed to a general mode as in operation 514, the processor 340 may change back, to an existing state (e.g., a general state), at least one configured value related to network communication and/or at least one configured value related to data processing, which were changed in the second mode.

The processor may recognize that a network requirement for latency is removed, and re-change a communication mode. According to various embodiments, when a general pattern is detected, the processor 340 may change a communication mode to a general mode as in operation 514, or when the first pattern is detected, the processor may change the communication mode to the first mode.

Figure 6B:
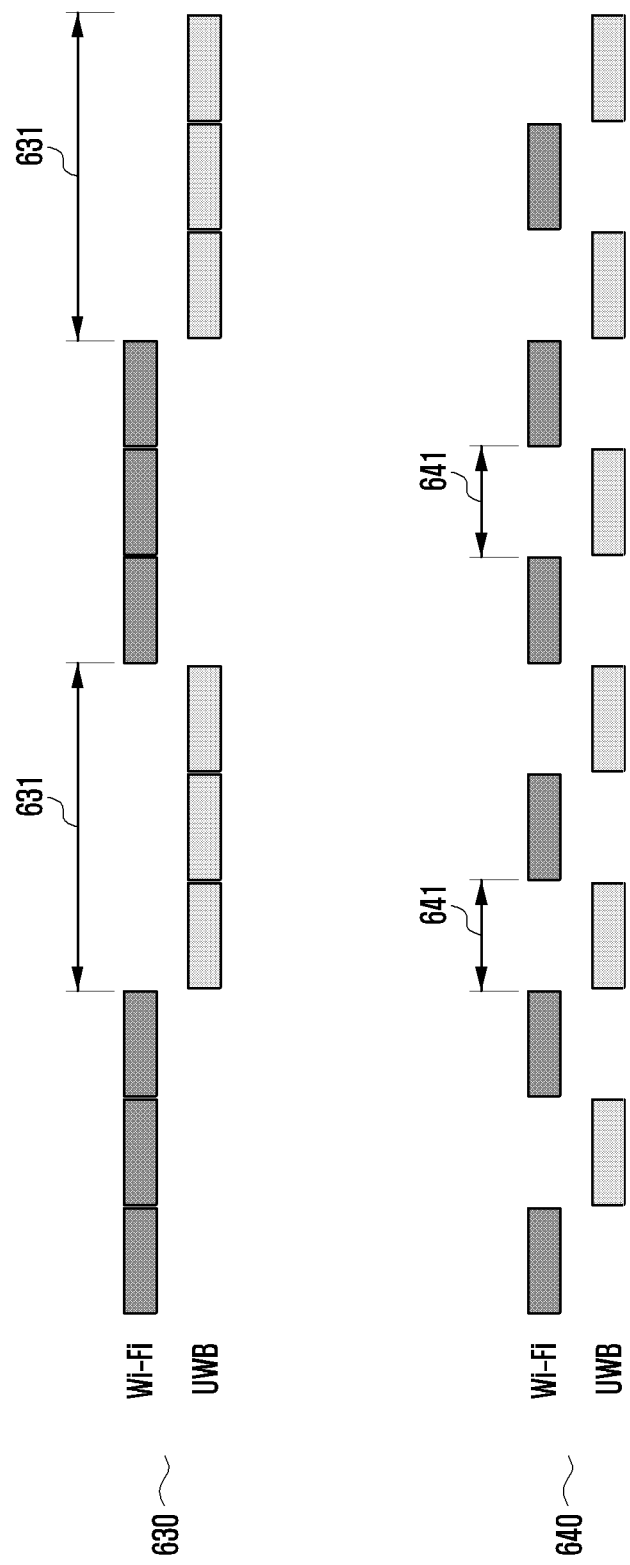

FIGS. 6A and 6B schematize adjustment of a wireless communication network scanning period of an electronic device according to various embodiments of the disclosure.

The processor 340 of the electronic device 300 may divide a network scanning period when low latency is required. For example, the processor 340 may divide a search period for multiple different networks when the first mode is executed. FIG. 6A schematizes a case where a Wi-Fi network and a Bluetooth network coexist in the same frequency band. Referring to FIG. 6A, the processor 340 may distribute time resources to communication with a Wi-Fi network and a Bluetooth network with respect to the same frequency resource. Wi-Fi and Bluetooth may share the same radio frequency of a 2.4 GHz band. The processor 340 may continuously scan each network for a signal via the communication module 310 with respect to both Bluetooth and Wi-Fi. Therefore, as indicated by reference numeral 610, when a proper communication mode is not executed, an operation of scanning Bluetooth for a signal may become longer, and relatively, data traffic delay of the Wi-Fi network may occur. For example, data transmission to the Wi-Fi network existing in the same frequency band as the Bluetooth network may be impossible by a time resource 611 allocated to an operation of scanning the Bluetooth network, and delay of data transmission may occur. According to various embodiments, the processor 340 may divide a scanning period for each network into short scanning periods for each network as indicated by reference numeral 620. Each network is scanned at the same duty ratio within a predetermined time. However, a period 621 of scanning the Bluetooth network once is short, and thus latency for the Wi-Fi network may be reduced.

FIG. 6B schematizes a case of coexistence between a Wi-Fi network and an ultra-wideband (UWB) network. FIG. 6B schematizes a case where a Wi-Fi network and a UWB network coexist in the same frequency band. Referring to FIG. 6B, the processor 340 may distribute time resources to communication with a Wi-Fi network and a UWB network with respect to the same frequency resource. The Wi-Fi and UWB network may share the same radio frequency of a 5 GHz band. The processor 340 may continuously scan each network for a signal via the communication module 310 with respect to both UWB and Wi-Fi. Therefore, as indicated by reference numeral 630, when a proper communication mode is not executed, an operation of scanning UWB for a signal may become longer, and relatively, data traffic delay of the Wi-Fi network may occur. For example, data transmission to the Wi-Fi network existing in the same frequency band as the UWB network may be impossible by a time resource 631 allocated to an operation of scanning the UWB network, and delay in data transmission may occur. According to various embodiments, the processor 340 may divide a scanning period for each network into short scanning periods (reference numeral 640). Each network is scanned at the same duty ratio within a predetermined time. However, a period 641 of scanning the UWB network once is short, and thus latency for the Wi-Fi network may be reduced.

Figure 7B:
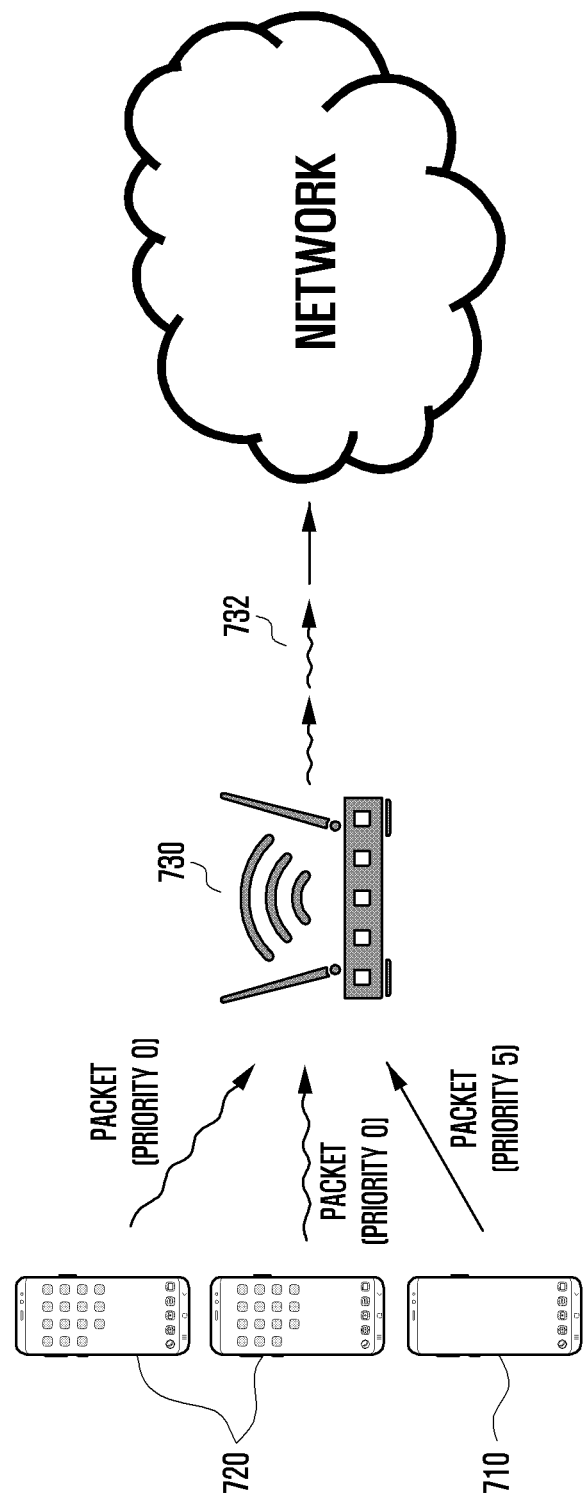

FIGS. 7A and 7B schematize a packet transmission control of an electronic device according to various embodiments of the disclosure.

The processor 340 may assign a priority to a packet when a network environment of low latency is required. According to various embodiments, when the first mode corresponding to the first pattern is executed, the processor may assign a priority to a packet requiring a network environment of low latency so as to reduce latency. For example, when the first mode is executed, the processor 340 may assign a relatively higher priority to a data packet related to the first application.

Referring to FIG. 7A, when a priority is not assigned, there is no priority between a packet of an electronic device 710 (e.g., the electronic device 101 in FIG. 1 or the electronic device 300 in FIG. 3) and a packet of an external electronic device 720 (e.g., the electronic device 102 in FIG. 1) connected to a network in the same AP (an access point 730) as that for the packet, and thus a collision may occur (reference numeral 731). In this case, it may be difficult to expect low latency.

Referring to FIG. 7B, when a higher priority is assigned to a packet of the electronic device 710, in a situation where a collision with a packet of the external electronic device 720 may occur, a packet requiring low latency may be preferentially processed in the AP 730 (reference number 732). Therefore, it is possible to expect low latency.

Figure 8:
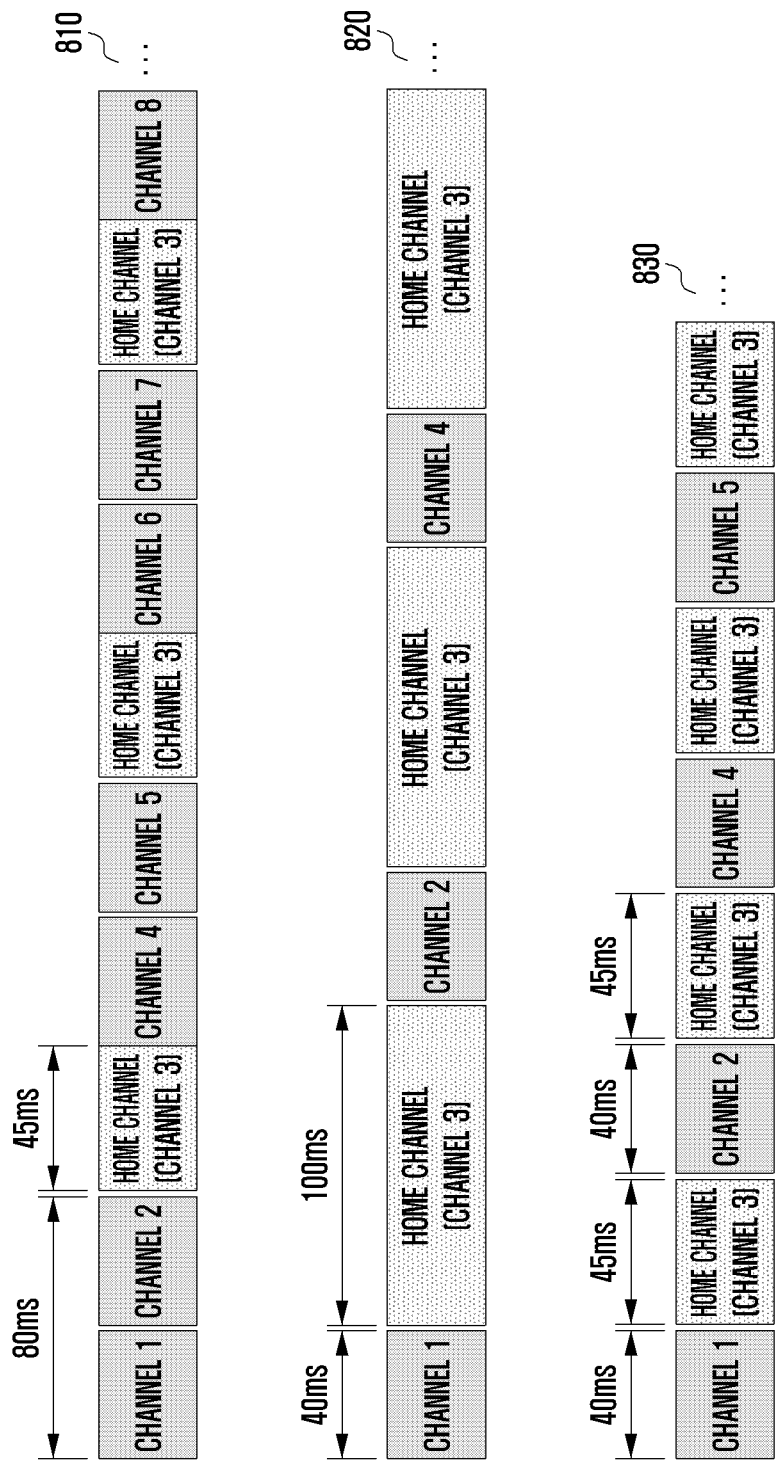
FIG. 8 schematizes adjustment of a period of scanning a channel in a wireless communication network by an electronic device according to an embodiment of the disclosure.

FIG. 8 schematizes adjustment of a period of scanning a channel in a wireless communication network by an electronic device according to an embodiment of the disclosure.

The processor 340 of the electronic device 300 may attempt to perform a scanning operation in order to roam to a different AP while transmitting data to an AP (e.g., the electronic device 102 in FIG. 1) via the communication module 310. For example, in case that a location-based service is executed in the electronic device 300, when the electronic device 300 is moved or when the quality of a Wi-Fi network degrades, a scanning operation for roaming to a different AP may be attempted. A Wi-Fi scanning operation may be executed for all Wi-Fi network channels supported by the electronic device 300. In a comparative embodiment, as indicated by reference numeral 810, when the electronic device 300 scans a channel other than a currently accessed channel, a current data transmission delay may occur. According to various embodiments, as indicated by reference numeral 820, the processor 340 may adjust a channel scanning period of the Wi-Fi network when the first mode is executed. The processor may relatively extend a time spent in a currently accessed channel (home channel) once. According to various embodiments, with respect to all time resources for scanning, a ratio of scanning a currently accessed channel may be increased compared to a ratio of scanning a different channel. Therefore, latency of data transmission may be relatively reduced. According to various embodiments, as indicated by reference numeral 830, the processor 340 may not extend a time spent in a currently accessed home channel and adjust an interval thereby adjusting a scan ratio. For example, the processor 340 may reduce a time spent in a different channel to relatively reduce a time interval for returning to home channel scanning. Therefore, a ratio of connection to a home channel currently transmitting data is increased thereby latency of data transmission may be relatively reduced.

Figure 9:
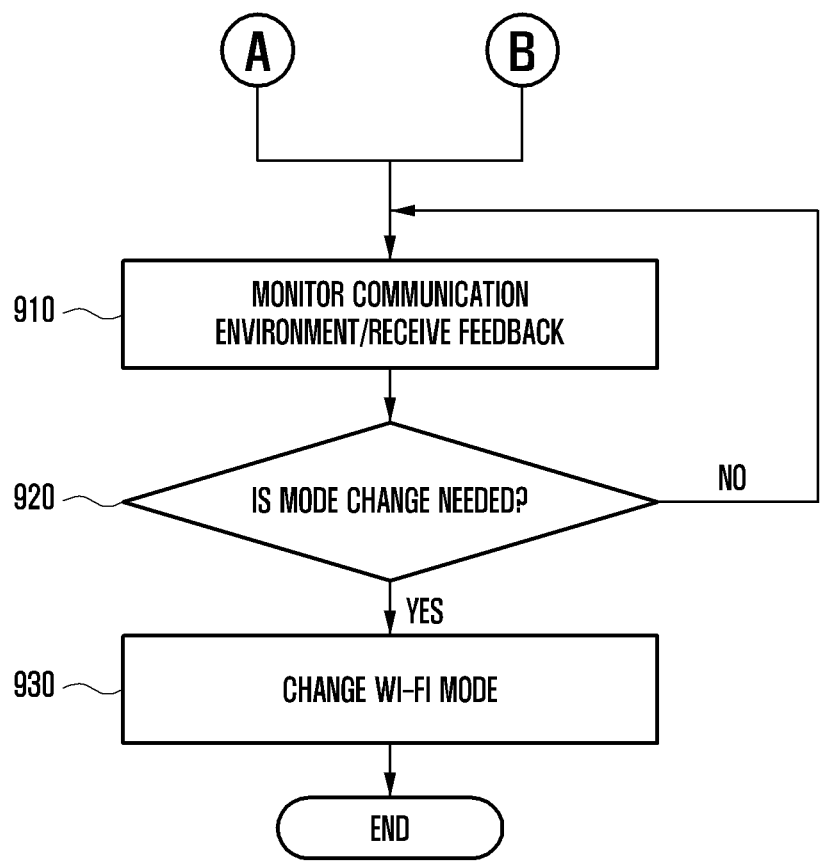
FIG. 9 is a flowchart of changing a communication mode of an electronic device according to an embodiment of the disclosure.

FIG. 9 is a flowchart of changing a communication mode of an electronic device according to an embodiment of the disclosure.

The processor 340 may monitor a communication environment around the electronic device 300, and receive feedback for an actual state of a network being currently accessed. The processor 340 may determine whether change of a communication mode is required, based on a result of monitoring the communication environment and the received feedback.

The processor 340 may analyze a traffic pattern required for each application and data transmission to determine a duration and an interval for frequency resource allocation required for network communication. However, when a fixed duration and a fixed interval corresponding to a predetermined pattern are configured based on only a traffic pattern, frequency resources may be wasted according to an actual network state. For example, with respect to data which is able to be received using only a time resource of 2 ms in case that a link speed is 100 Mbps, the data may be received using a time resource of 20 ms in case that a link speed is 10 Mbps. In addition, the reception may require more time according to the characteristic of a Wi-Fi network in which, even if a signal strength is the same, when there are many external electronic devices using the same frequency therearound, a channel is occupied through contention. That is, in case that an application requiring low latency for the Wi-Fi network is executed, when a time resource of 2 ms of every 50 ms is allocated to the Wi-Fi network and a time resource of 48 ms is allocated to a different communication scheme, such as Bluetooth, Bluetooth low energy, and/or UWB, according to an environment providing a good link quality, latency of an application using Wi-Fi may be increased in an environment providing a poor link quality. On the contrary, when, in order to lower latency even in an environment providing a bad link quality, a time resource of 20 ms of every 50 ms is allocated to the Wi-Fi network and a time resource of 30 ms is allocated to a different network, a time resource of 18 ms of every 50 ms may be wasted in an environment providing a good link quality. In a case of Wi-Fi channel scanning described above, for example, when a time resource of 100 ms is allocated to a currently accessed channel in an environment in which only a time resource of 2 ms of every 50 ms is enough, a time for which two channels are searchable may be wasted, and thus Wi-Fi searching time may become longer. Therefore, in order to increase the efficiency of frequency resource use, feedback reflecting an actual network state, for a communication mode determined by the processor 340 may be needed.

In operation 910, the processor 340 may monitor an actual network state according to a communication environment, and receive feedback for the actual network state. According to various embodiments, the processor 340 may identify feedback for a network environment by using information on an electric field strength of a network, and information on time consumed for data transmission or reception. For example, the processor 340 may identify a received signal strength indication (RSSI), a signal-to-noise ratio (SNR), Tx failure, a Tx-retransmission ratio, and clear channel assessment (CCA). According to various embodiments, the processor 340 may estimate a duration by using information on an electric field strength of a network, and information on time consumed for data transmission or reception, and receive the duration as feedback.

In operation 920, the processor 340 may receive feedback for an actual network state, and determine whether a communication mode is required to be changed, based on the feedback. According to various embodiments, the processor 340 may determine whether change of a communication mode is needed, based on feedback for a data traffic pattern and feedback for an actual network state. For example, the processor 340 may continuously monitor a data traffic and detect a traffic pattern while executing a particular communication mode, and continuously receive feedback for an actual network state. According to various embodiments, when a requirement for network communication is changed or when an actual network state around the electronic device 300 is changed, the processor 340 may detect the change and determine whether change of a communication mode is needed. For example, a change of an actual network state around the electronic device 300 may include movement of the electronic device 300 or detection of a new external electronic device. The processor 340 may proceed to operation 930 when a change of a communication mode is needed, or may continuously monitor an actual network environment while maintaining an existing communication mode when it is determined that a change of a communication mode is not needed.

In operation 930, the processor 340 may change a communication mode. According to various embodiments, it is also possible for the processor 340 to maintain some of configuration values of an existing communication mode being executed, based on feedback for an actual network state, and change only the remaining configuration values.

Figure 10:
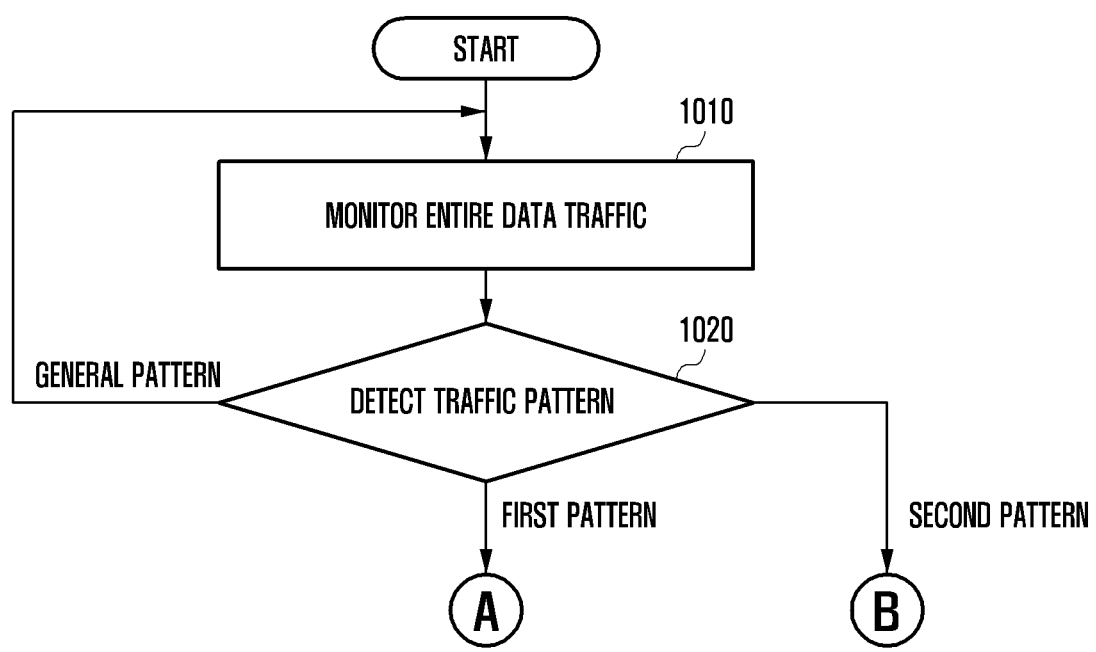
FIG. 10 is a flowchart of detecting a traffic pattern by an electronic device according to an embodiment of the disclosure.

FIG. 10 is a flowchart of detecting a traffic pattern by an according to an embodiment of the disclosure.

In operation 1010, the processor 340 may monitor entire data traffic. For example, the processor 340 may monitor the entire data traffic of the electronic device 300. According to various embodiments, the traffic monitored by the processor 340 may include traffic for a foreground application being executed, and data traffic for a background application. According to various embodiments, the processor 340 may monitor entire data traffic transmitted and received as the communication module 310 regardless of an application or a service being executed, and identify at least one parameter value related to the entire data traffic.

In operation 1020, the processor 340 may detect a traffic pattern, based on the at least one parameter value related to the entire data traffic. According to various embodiments, the processor 340 may determine a communication mode corresponding to the detected traffic pattern. According to various embodiments, the processor 340 may proceed to operation A when a first pattern is detected, and proceed to operation B when a second pattern is detected. According to various embodiments, when a pattern not corresponding to one of the first pattern and the second pattern is detected, the processor 340 may recognize the pattern being a general pattern, and return to operation 1010.

According to an embodiment, when Wi-Fi and different communication (e.g., Bluetooth, Bluetooth low energy, and/or UWB) share the same radio frequency, the processor 340 may raise the priority of the Wi-Fi communication to be higher than that of the different communication, based on a pattern of traffic. For example, when the Wi-Fi communication has a first pattern or a second pattern, the processor 340 may raise the priority of Wi-Fi communication to be higher than that of the different communication.

Referring to FIGS. 3 and 4, an electronic device according to various embodiments disclosed herein may include: a communication module; and a processor operatively connected to the communication module, wherein the processor is configured to: identify at least one of multiple parameters of data traffic transmitted and received using a first short-range wireless communication in a particular application being executed; detect a data traffic pattern, based on the identified at least one parameter; and execute a communication mode including at least one configuration value related to the first short-range wireless communication, based on the detected pattern, and wherein the executing of the communication mode includes at least one of the operations of: adjusting a scanning period between the first short-range wireless communication and a second short-range wireless communication which is operable in a frequency band identical to that of the first short-range wireless communication and includes at least one short-range wireless communication different from the first short-range wireless communication; configuring a priority of a transmission packet; adjusting a channel scan ratio of the first short-range wireless communication; and configuring boosting for calculation of the data traffic transmitted and received by the processor.

Referring to FIGS. 5A and 5B, the multiple parameters may include at least one of a size of a transmitted or received packet, the number of packets, a packet transmission or reception interval, a packet bandwidth, and a type of a communication protocol being used, the data traffic pattern may include a first pattern and a second pattern, the communication mode may include a general mode, a first mode based on the first pattern, and a second mode based on the second pattern, and the executing of the communication mode may include the operations of: in case that the general mode is changed to the first mode, adjusting a scanning period between the first short-range wireless communication and the second short-range wireless communication; configuring a priority of a transmission packet; and adjusting a channel scan ratio of the first short-range wireless communication.

Referring to FIG. 5C, the changing of the communication mode may include an operation of, in case that the general mode is changed to the second mode, configuring boosting for calculation of the data traffic transmitted and received by the processor.

Referring to FIG. 6A, the first short-range wireless communication may include a Wi-Fi network, the second short-range wireless communication may include a Bluetooth network, and the operation of adjusting the scanning period between the first short-range wireless communication and the second short-range wireless communication may include an operation of dividing the scanning period between the first short-range wireless communication and the second short-range wireless communication.

Referring to FIG. 6B, the first short-range wireless communication may include a Wi-Fi network, the second short-range wireless communication may include an ultra-wideband (UWB) network, and the operation of adjusting the scanning period between the first short-range wireless communication and the second short-range wireless communication may include an operation of dividing the scanning period between the first short-range wireless communication and the second short-range wireless communication.

Referring to FIGS. 7A and 7B, the operation of configuring the priority of the transmission packet may include an operation of assigning a higher priority to a transmission data packet related to the particular application.

Referring to FIG. 8, the first short-range wireless communication may include a Wi-Fi network, and the operation of adjusting the channel scan ratio of the first short-range wireless communication may further include an operation of adjusting a search ratio between a currently accessed channel and at least one channel different from the currently accessed channel in the Wi-Fi network.

Referring to FIG. 8, the operation of adjusting the search ratio may include an operation of re-distributing time resources to each channel with respect to the currently accessed channel and the at least one channel different from the currently accessed channel.

Referring to FIGS. 5A and 5B, the processor may be configured to monitor a voice over Internet protocol (VoIP) audio path of the electronic device, detect the audio path, and execute the communication mode in case that the audio path is detected, and the detecting of the audio path may include an operation of detecting an audio signal transmitted from a microphone of the electronic device and an audio signal transmitted from a speaker of the electronic device.

Referring to FIG. 9, the processor may be configured to monitor a network environment of the electronic device, and change the communication mode, based on the network environment.

Referring to FIGS. 3 and 4, a method for changing a communication mode of an electronic device according to various embodiments disclosed herein may include: identifying at least one of multiple parameters of data traffic transmitted and received using a first short-range wireless communication in a particular application being executed; detecting a data traffic pattern, based on the identified at least one parameter; and executing a communication mode including at least one configuration value related to the first short-range wireless communication, based on the detected pattern, wherein the executing of the communication mode includes at least one of the operations of: adjusting a scanning period between the first short-range wireless communication and a second short-range wireless communication which is operable in a frequency band identical to that of the first short-range wireless communication and includes at least one short-range wireless communication different from the first short-range wireless communication; configuring a priority of a transmission packet; adjusting a channel scan ratio of the first short-range wireless communication; and configuring boosting for calculation of the data traffic transmitted and received by the processor of the electronic device.

Referring to FIGS. 5A and 5B, the multiple parameters may include at least one of a size of a transmitted or received packet, the number of packets, a packet transmission or reception interval, a packet bandwidth, and a type of a communication protocol being used, the data traffic pattern may include a first pattern and a second pattern, the communication mode may include a general mode, a first mode corresponding to the first pattern, and a second mode corresponding to the second pattern, and the executing of the communication mode may include: in case that the general mode is changed to the first mode, adjusting a scanning period between the first short-range wireless communication and the second short-range wireless communication; configuring a priority of a transmission packet; and adjusting a channel scan ratio of the first short-range wireless communication.

Referring to FIG. 5C, the changing of the communication mode may include configuring boosting for calculation of the data traffic transmitted and received by the processor, in case that the general mode is changed to the second mode.

Referring to FIG. 6A, the first short-range wireless communication may include a Wi-Fi network, the second short-range wireless communication may include a Bluetooth network, and the adjusting of the scanning period between the first short-range wireless communication and the second short-range wireless communication may include dividing the scanning period between the first short-range wireless communication and the second short-range wireless communication.

Referring to FIG. 6B, the first short-range wireless communication may include a Wi-Fi network, the second short-range wireless communication may include an ultra-wideband (UWB) network, and the adjusting of the scanning period between the first short-range wireless communication and the second short-range wireless communication may include dividing the scanning period between the first short-range wireless communication and the second short-range wireless communication.

Referring to FIGS. 7A and 7B, the configuring of the priority of the transmission packet may include assigning a higher priority to a transmission data packet related to the particular application.

Referring to FIG. 8, the first short-range wireless communication may include a Wi-Fi network, and the adjusting of the channel scan ratio of the first short-range wireless communication may further include adjusting a search ratio between a currently accessed channel and at least one channel different from the currently accessed channel in the Wi-Fi network.

Referring to FIG. 8, the adjusting of the search ratio may include re-distributing time resources to each channel with respect to the currently accessed channel and the at least one channel different from the currently accessed channel.

Referring to FIGS. 5A and 5B, the method may further include: monitoring a voice over Internet protocol (VoIP) audio path of the electronic device; detecting the audio path; and executing the communication mode in case that the audio path is detected, and the detecting of the audio path may include detecting an audio signal transmitted from a microphone of the electronic device and an audio signal transmitted from a speaker of the electronic device.

Referring to FIG. 9, the method may further include monitoring a network environment of the electronic device, and re-changing the communication mode, based on the network environment.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first," "a second," "the first," and "the second" may be used to simply distinguish a corresponding element from another, and does not limit the elements in other aspect (e.g., importance or order). It is to be understood that if an element (e.g., a first element) is referred to, with or without the term "operatively" or "communicatively," as "coupled with/to" or connected with"/"to another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit." The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities mat be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
memory storing instructions;
communication circuitry performing a first short-range wireless communication and a second short-range wireless communication; and
a processor operatively connected to the communication circuitry,
wherein the instructions, when executed by the processor, cause the electronic device to:
identify at least one information related to data traffic, transmitted or received using the first short-range wireless communication, the data traffic being associated with an application being executed, and based on the identified at least one information, shorten both a scanning period for the first short-range wireless communication and a scanning period for the second short-range wireless communication, wherein at least a portion of a frequency band of the second short-range wireless communication is identical with a frequency band of the first short-range wireless communication, and wherein the frequency band of the second short-range wireless communication includes at least one short-range wireless communication different from the first short range wireless communication.

2. The electronic device of claim 1, wherein the at least one information comprises at least one of a size of a transmitted or received packet, a number of packets, a packet transmission or reception interval, a packet bandwidth, or a type of a communication protocol being used, wherein the identified at least one information includes a first pattern of the data traffic, and wherein the instructions, when executed by the processor, cause the electronic device to:
adjust the scanning period for the first short-range wireless communication and the scanning period for the second short-range wireless communication,
configure a priority of a transmission packet, and
adjust a channel scan ratio of the first short-range wireless communication.

3. The electronic device of claim 2, wherein the first short-range wireless communication comprises a Wi-Fi network, wherein the second short-range wireless communication comprises a Bluetooth network, and wherein the adjusting of the scanning period between the first short-range wireless communication and the second short-range wireless communication comprises dividing the scanning period between the first short-range wireless communication and the second short-range wireless communication.

4. The electronic device of claim 2, wherein the first short-range wireless communication comprises a Wi-Fi network, wherein the second short-range wireless communication comprises an ultra-wideband (UWB) network, and wherein the adjusting of the scanning period between the first short-range wireless communication and the second short-range wireless communication comprises dividing the scanning period between the first short-range wireless communication and the second short-range wireless communication.

5. The electronic device of claim 2, wherein the configuring of the priority of the transmission packet comprises assigning a higher priority to a transmission data packet related to the application being executed.

6. The electronic device of claim 2, wherein the first short-range wireless communication comprises a Wi-Fi network, and wherein the adjusting of the channel scan ratio of the first short-range wireless communication comprises adjusting a search ratio between a currently accessed channel and at least one channel different from the currently accessed channel in the Wi-Fi network.

7. The electronic device of claim 6, wherein the adjusting of the search ratio comprises re-distributing time resources to each channel with respect to the currently accessed channel and the at least one channel different from the currently accessed channel.

8. The electronic device of claim 1, wherein the identified at least one information includes a second pattern of the data traffic, and wherein the instructions, when executed by the processor, cause the electronic device to:
configure boosting for calculation of the data traffic transmitted and received by the processor.

9. The electronic device of claim 1, wherein the at least one information is identified based on a threshold of a parameter, which is pre-stored in a memory of the electronic device.

10. The electronic device of claim 1, wherein the instructions, when executed by the processor, further cause the electronic device to:
monitor a voice over Internet protocol (VoIP) audio path of the electronic device,
detect the VoIP audio path, and
execute a communication mode in case that the VoIP audio path is detected, and wherein the detecting of the VoIP audio path comprises detecting an audio signal transmitted from a microphone of the electronic device and an audio signal transmitted from a speaker of the electronic device.

11. The electronic device of claim 1, wherein the instructions, when executed by the processor, further cause the electronic device to:
monitor a network environment of the electronic device; and
change a communication mode, based on the network environment.

12. A method for changing a communication mode of an electronic device, the method comprising:
identifying at least one information related to data traffic transmitted or received using a first short-range wireless communication, the data traffic being associated with an application being executed; and
based on the identified at least one information, shortening both a scanning period for the first short-range wireless communication and a scanning period for a second short-range wireless communication, wherein at least a portion of a frequency band of the second short-range wireless communication is identical with a frequency band of the first short-range wireless communication, and wherein the frequency band of the second short-range wireless communication includes at least one short-range wireless communication different from the first short range wireless communication.

13. The method of claim 12, wherein the at least one information comprises at least one of a size of a transmitted or received packet, a number of packets, a packet transmission or reception interval, a packet bandwidth, or a type of a communication protocol being used, and wherein the identified at least one information includes a first pattern of the data traffic, wherein the method comprises:
adjusting the scanning period for the first short-range wireless communication and the scanning period for the second short-range wireless communication,
configuring a priority of a transmission packet, and
adjusting a channel scan ratio of the first short-range wireless communication.

14. The method of claim 13,
wherein the first short-range wireless communication comprises a Wi-Fi network,
wherein the second short-range wireless communication comprises a Bluetooth network, and
wherein the adjusting of the scanning period between the first short-range wireless communication and the second short-range wireless communication comprises dividing the scanning period between the first short-range wireless communication and the second short-range wireless communication.

15. The method of claim 13,
wherein the first short-range wireless communication comprises a Wi-Fi network,
wherein the second short-range wireless communication comprises an ultra-wideband (UWB) network, and
wherein the adjusting of the scanning period between the first short-range wireless communication and the second short-range wireless communication comprises dividing the scanning period between the first short-range wireless communication and the second short-range wireless communication.

16. The method of claim 12,
wherein the identified at least one information includes a second pattern of the data traffic, and
wherein the method comprises:
configuring boosting for calculation of the data traffic transmitted and received by a processor.

17. The method of claim 12, further comprising:
storing, when a first application is stored or installed in a memory of the electronic device, information relating to whether the first application is an application using a network.

18. The method of claim 12, further comprising:
recognizing that the identified at least one information includes a pattern of the data traffic requiring low latency.

19. The method of claim 12, further comprising:
recognizing that the identified at least one information includes a pattern of the data traffic requiring high throughput.

* * * * *